(12) United States Patent
Ivarsson et al.

(10) Patent No.: US 11,962,358 B2
(45) Date of Patent: Apr. 16, 2024

(54) POWER DETECTION IN THE FREQUENCY DOMAIN ON A SUBCARRIER BY SUBCARRIER BASIS

(71) Applicant: Dell Products, L.P., Round Rock, TX (US)

(72) Inventors: Tommy Ivarsson, Ottawa (CA); John Bradley Deforge, Quebec (CA); Sewvanda Don, Ottawa (CA); Mikhail Shenouda, Nepean (CA)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 17/710,788

(22) Filed: Mar. 31, 2022

(65) Prior Publication Data
US 2023/0318718 A1    Oct. 5, 2023

(51) Int. Cl.
*H04B 17/18* (2015.01)
*H04B 17/10* (2015.01)
*H04B 17/29* (2015.01)
*H04B 17/318* (2015.01)

(52) U.S. Cl.
CPC ............ *H04B 17/18* (2015.01); *H04B 17/10* (2015.01); *H04B 17/29* (2015.01); *H04B 17/318* (2015.01)

(58) Field of Classification Search
CPC ................. H04B 17/18; H04B 17/29
See application file for complete search history.

(56) References Cited

U.S. PATENT DOCUMENTS

| 5,541,953 A * | 7/1996 | Hiben ............... H04L 27/2067 375/295 |
| 9,129,663 B2 * | 9/2015 | Park ..................... G11C 8/12 |
| 2001/0009467 A1 * | 7/2001 | Fujita ............. H04B 10/25133 398/147 |
| 2005/0002324 A1 | 1/2005 | Sutivong et al. |

(Continued)

FOREIGN PATENT DOCUMENTS

EP    1494379 A1    1/2005

OTHER PUBLICATIONS

ORAN, "O-RAN Alliance," https://www.o-ran.org, Retrieved from the Internet: Jun. 13, 2022.

(Continued)

*Primary Examiner* — Dominic E Rego
(74) *Attorney, Agent, or Firm* — Amin, Turocy & Watson, LLP

(57) ABSTRACT

Technology described herein can gather frequency domain power data for enabling real-time adjustment of one or more parameters of a radio system. In an embodiment, a system can comprise a processor that is configured to control collection of power data relative to a subcarrier of a radio system, a read circuit communicatively coupled to the processor and controlled by the processor to read, at the radio system, the power data in a frequency domain, relative to the subcarrier, along a selected time range that is defined by an upper limit of time and a lower limit of time, and a memory communicatively coupled to the processor and that receives and stores the power data in the frequency domain from the read circuit. In one or more embodiments, power data in the frequency domain is collected at a frequency of a subcarrier and/or at a frequency between subcarriers.

20 Claims, 13 Drawing Sheets

(56) References Cited

U.S. PATENT DOCUMENTS

| | | | | |
|---|---|---|---|---|
| 2005/0138437 | A1* | 6/2005 | Allen | G06F 1/26 |
| | | | | 713/300 |
| 2006/0017756 | A1* | 1/2006 | Huang | B41J 2/17546 |
| | | | | 347/7 |
| 2010/0210301 | A1* | 8/2010 | Dietz | H04W 52/0254 |
| | | | | 340/670 |
| 2010/0290372 | A1* | 11/2010 | Zhong | H04B 7/2684 |
| | | | | 370/294 |
| 2013/0225254 | A1* | 8/2013 | Pececnik | G07F 17/326 |
| | | | | 463/17 |
| 2020/0153624 | A1* | 5/2020 | Wentz | G06F 21/32 |
| 2022/0060450 | A1* | 2/2022 | Slovetskiy | H04L 9/0894 |

OTHER PUBLICATIONS

Telecom Infra Project, "OpenRAN," https://telecominfraproject.com/openran/, Retrieved from the Internet: Jun. 13, 2022.

International Search Report and Written Opinion received for PCT Application Serial No. PCT/US22/53050 dated Apr. 28, 2023, 17 pages.

Wang et al. "Frequency-Domain Oversampling for Zero-Padded OFDM in Underwater Acoustic Communications" IEEE, 2010, 5 pages.

* cited by examiner

POWER DETECTION IN THE FREQUENCY DOMAIN ON A SUBCARRIER BY SUBCARRIER BASIS

BACKGROUND

Modern cellular systems continue to advance, where dynamic changes can be made to improve one or more aspects and/or to provide one or more new services and/or other aspects. These dynamic changes can benefit from knowledge, information and/or data regarding how a system is functioning, system issues, troubleshooting performance and/or adjustments made to address functions and/or issues. That is, such knowledge, information and/or data relative to hardware, firmware and/or software can be useful in proactively addressing such issues, performing troubleshooting, and/or overall, improving one or more systems, and/or subsystems of such cellular systems, such as of related radio systems.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Generally provided is a system for frequency domain power detection. Frequency domain detection can be performed on data at a radio system, such as at the digital front end, where data is natively in the frequency domain. Ability to detect power in the frequency domain can enable the ability to precisely extract power of a signal at a predetermined frequency and/or set of frequencies. Time alignment of the data can enable input to output comparison (e.g., relative to input/output of a respective digital front end).

An example method can comprise detecting, by a system comprising a processor, power data in a frequency domain relative to a subcarrier of a radio system of a radio system, reading, by the system at the radio system, the power data in the frequency domain along a non-changing time range of the radio system, and storing, by the system, the power data in the frequency domain at a memory.

An example system can comprise a processor that is configured to control collection of power data relative to a subcarrier of a radio system, a read circuit communicatively coupled to the processor and controlled by the processor to read, at the radio system, the power data in a frequency domain, relative to the subcarrier, along a selected time range that is defined by an upper limit of time and a lower limit of time, and a memory communicatively coupled to the processor and that receives and stores the power data in the frequency domain from the read circuit.

Another example system can comprise a group of power detectors that are configured to control collection of power data from a group of subcarriers of a radio system, wherein the power detectors of the group of power detectors comprise respective read circuits that are configured to read the power data in a frequency domain, of a single subcarrier of the group of subcarriers, or of a single frequency range between a successive pair of subcarriers of the group of subcarriers, along a common selected time range having boundaries that are aligned at time boundaries of the radio system, and wherein the respective read circuits are further configured to read the power data in the frequency domain to a memory communicatively coupled to and configured to receive and store power data from at least one subcarrier of the group of subcarriers.

BRIEF DESCRIPTION OF THE DRAWINGS

The technology described herein is illustrated by way of example and not limited in the accompanying figures, in which like reference numerals indicate similar elements.

DETAILED DESCRIPTION

Overview

Figure 1:
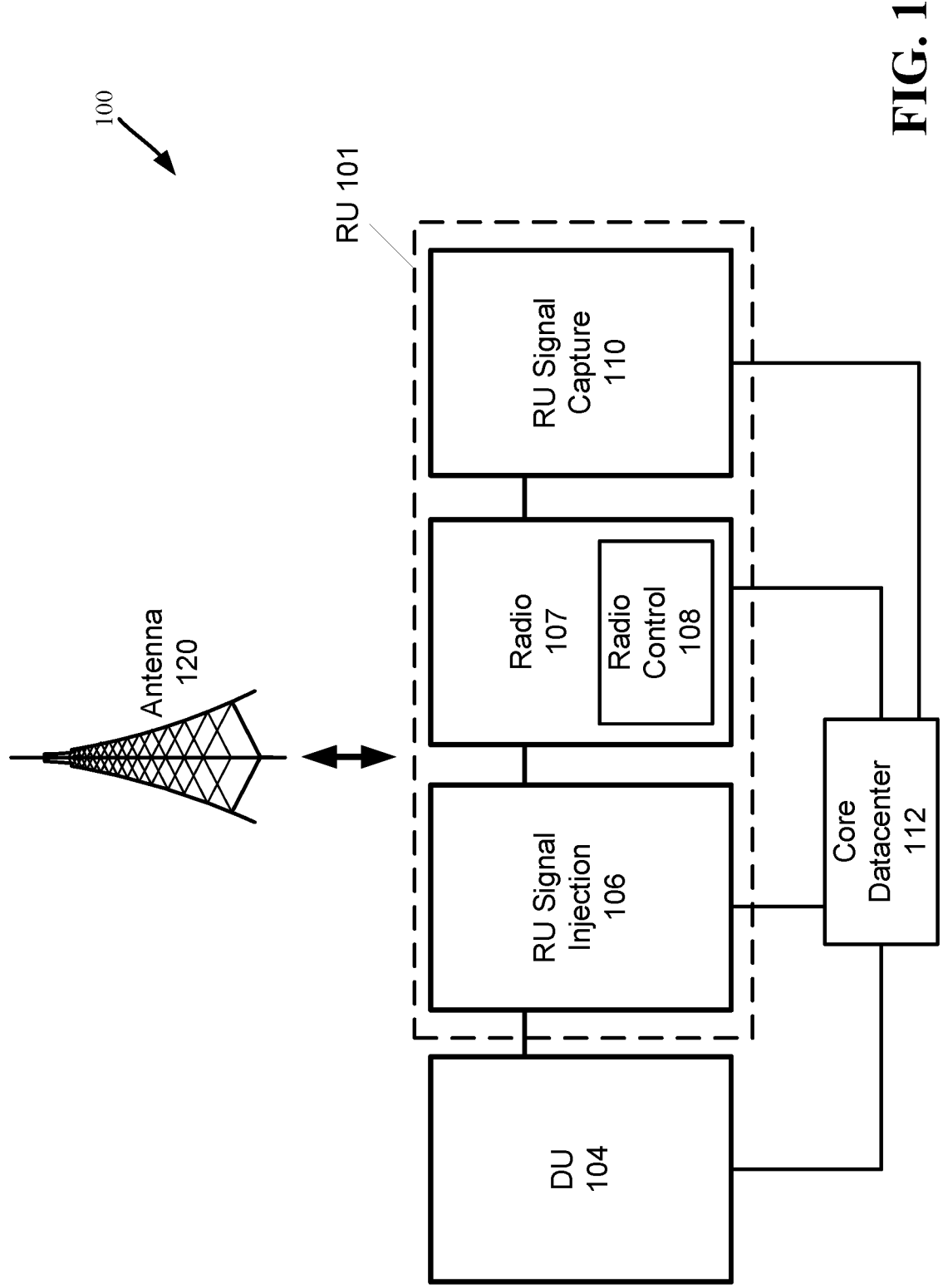
FIG. 1 illustrates a schematic representation of example elements of a radio system, in accordance with one or more embodiments and/or implementations described herein.

The technology described herein is generally directed towards a process to collect, synchronize and/or analyze data, such as power data, in the frequency domain of a radio system. The technology described herein can perform such operations in a hardware accelerated manner. That is, radio system reliability, serviceability and manageability are all aspects of a functioning radio system of a cellular system that are important both to the user and the provider. These aspects can benefit from knowledge, information and/or data/metadata gained from tracking, collecting, mapping and/or analyzing performance of a radio system. That is, there is a desire to measure radio performance, and/or to generate and/or store data in one or more ways that allow for comparative analysis of such data (including metadata) that is collected from different sources, at different time points, and/or relative to one or more other dynamic and/or changing variables.

The data collected and/or the results of analysis of the data can allow for real-time, immediate, short term and/or long term improvements, troubleshooting and/or predictive modeling regarding radio system performance, failures, issues, continuity and/or other aspects. For example, the resulting data, such as telemetry, radio frequency (e.g., analog data) and/or digital performance and/or comparative data, and/or underlying infrastructure utilization statistics can be used to improve network performance, plan network capacity, and/or identify new service opportunities, relative to the radio system. Various types of data can be collected, such as, but not limited to, data represented in a frequency domain (FD) and/or data represented in a time domain (TD).

Relative to data collection in the frequency domain, in existing radio systems, a highest system resolution is generally 1 subcarrier (SC). The data obtained from such resolution can be limiting.

Generally, one or more embodiments described herein are directed to detection and storage of radio system power data in the frequency domain. The power data can be synchronized along system timing boundaries. Generally, the power data can be employed to provide proactive and reactive responses, updates and/or troubleshooting of a respective radio system of a cellular system. More particularly, one or more embodiments here can facilitate an ability of a service provider (of a radio system) to precisely extract power of a signal at a predetermined frequency and/or multiple frequencies, and to resolve that data on a subcarrier by subcarrier (SC/SC) basis. In one or more embodiments, power of an SC, multiple SC's, between an SC and one or more SC's, and/or between multiple SC's can be measured, which data can be used, as mentioned above, relative to managing performance, system operation, maintenance and customer experience of the respective radio system. Using the one or more embodiments described herein, such data can not only be collected and measured, but also recorded, stored and recalled, such as automatically and/or employing artificial intelligence, machine learning, deep learning and/or the like to proactively and/or reactively address the performance, system operation, maintenance and customer experience of the respective radio system.

To provide these one or more operations and/or features, reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power, thermal power, size, weight and/or the like.

As used herein, the term "resource" can refer to power, money, memory, processing power and/or the like.

Example Radio System Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIG. 1 and/or with other figures described herein.

Turning now to FIG. 1, a high-level radio system architecture is illustrated at 100. The radio system 100 can comprise a distributed unit (DU) signal injection portion 104 (also herein referred to as a DU portion 104) and a radio unit (RU) 101. The RU 101 can comprise a radio unit (RU) signal injection portion 106 (also herein referred to as an RU signal injection portion 106), the radio control 108, and an RU signal capture portion 110. Generally, the DU portion 104 can provide both baseband processing and RF functions. The RU signal capture portion 110 can take signals from a respective antenna 120 and convert the RF signal into a data signal, and vice versa. The RU signal capture portion 110 can have one or more statistical counters, accumulators, counter circuits and/or the like.

In one or more embodiments, the RU signal capture portion 110 can analyze data captured, such as via historical information. This analysis and data gathering can be performed at least partially autonomously, such as majoratively and/or fully autonomously, such as absent input from the DU portion 104 and/or any centralized unit (CU). In one or more embodiments, the radio control 108, in view of information received from the RU signal capture portion 110, can place an order for service, maintenance, hardware and/or firmware to a core data center 112. In one or more embodiments, the radio control 108, in view of information received from the RU signal capture portion 110, can at least partially autonomously request or request and receive one or more software, firmware and/or other system updates. Together, the DU portion 104 and RU portion 106 can provide data to, and receive data from, the core datacenter 112.

Figure 2:
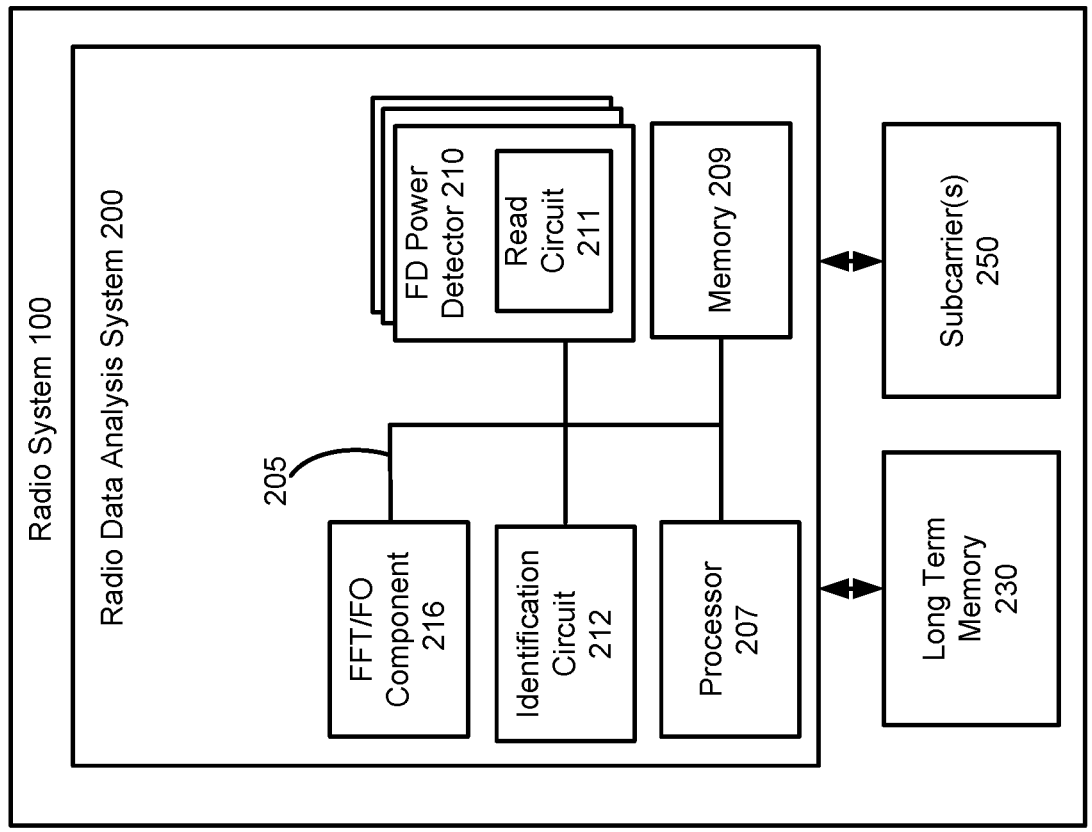
FIG. 2 illustrates another schematic representation of the radio system of FIG. 1, comprising a radio data analysis system, in accordance with one or more embodiments and/or implementations described herein.

Turning next to FIG. 2, an example of a radio data analysis system architecture is illustrated at 200, with description being provided below. The radio data analysis system 200 can be part of the radio system 100 (e.g., of FIG. 1) or can be at least partially external to the radio system 100. For purposes of brevity, additional aspects of the radio system 100 (e.g., as illustrated at FIG. 1) are not illustrated at FIG. 2. While referring here to one or more processes, operations, facilitations and/or uses of the non-limiting system architecture 200, description provided herein, both above and below, also can be relevant to one or more other non-limiting system architectures described herein.

FIG. 2 illustrates a schematic of the radio data analysis system 200 for detecting, reading and gathering power data in the frequency domain relative to one or more subcarriers and relative to time aligned relative to time boundaries of the radio system 100. Generally, the power data in the frequency domain can be read and collected at various tap points of the radio system, where the power data is natively in the frequency domain.

Generally, the radio data analysis system 200 can comprise any suitable computing devices, hardware, software, operating systems, drivers, network interfaces and/or so forth. However, for purposes of brevity, only components generally relevant to frequency domain power data detection, collection and/or analysis are illustrated in FIG. 2. For example, the radio data analysis system 200 can comprise a processor 207, memory 209, power detector 210, read circuit 211, identification circuit 212 and/or fast Fourier transform/frequency offset (FFT/FO) component 216.

Discussion first turns to the processor 207, memory 209 and bus 205 of the radio data analysis system 200.

In one or more embodiments, radio data analysis system 200 can comprise the processor 207 (e.g., computer processing unit, microprocessor, classical processor and/or like processor). In one or more embodiments, a component associated with radio data analysis system 200, as described herein with or without reference to the one or more figures of the one or more embodiments, can comprise one or more computer and/or machine readable, writable and/or executable components and/or instructions that can be executed by processor 207 to facilitate performance of one or more processes defined by such component(s) and/or instruction(s). In one or more embodiments, the processor 207 can comprise the FFT/FO component 216.

The processor 207 can be configured to control one or more components/elements of the radio data analysis system 200, such as the power detector 210, read circuit 211, identification circuit 212 and/or fast Fourier transform/ frequency offset (FFT/FO) component 216. That is, the processor 207 can be configured to control collection of power data relative to the radio system 100, such as relative to a subcarrier 250 of the radio system 100. For example, the processor 207 can be configured to control collection of power data in the frequency domain at a frequency of a subcarrier 250 and/or at a frequency, sub-frequency or frequency range between subcarriers. As used herein, "between subcarriers" can refer to being between a subcarrier and another subcarrier other than the subcarrier, where the another subcarrier is a next higher or next lower subcarrier of the radio system (e.g., according to the subcarrier spacing of the radio system 100, such as 30 KHz spacing or numerology 1 spacing).

In one or more embodiments, the radio data analysis system 200 can comprise the machine-readable memory 209 that can be operably connected to the processor 207. The memory 209 can store computer-executable instructions that, upon execution by the processor 207, can cause the processor 207 and/or one or more other components of the radio data analysis system 200 (e.g., power detector 210, read circuit 211, identification circuit 212 and/or fast Fourier transform/frequency offset (FFT/FO) component 216) to perform one or more actions. In one or more embodiments, the memory 209 can store one or more computer-executable components.

Radio data analysis system 200 and/or a component thereof as described herein, can be communicatively, electrically, operatively, optically and/or otherwise coupled to one another via a bus 205 to perform functions of non-limiting system architecture 200, radio data analysis system 200 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, radio data analysis system 200 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 200 can reside in the cloud, and/or can reside locally in a local computing environment (e.g., at a specified location(s)).

In addition to the processor 207 and/or memory 209 described above, radio data analysis system 200 can comprise one or more computer and/or machine readable, writable and/or executable components and/or instructions that, when executed by processor 207, can facilitate performance of one or more operations defined by such component(s) and/or instruction(s).

Turning now to additional elements of the radio data analysis system 200, frequency domain (FD) power detection can be performed on data within a data stream of a digital front end (DFE) of a radio system, where such data is natively in frequency domain. Ability to detect power in the frequency domain can allow for the ability to precisely extract the power of a signal at a predetermined frequency or set of frequencies. Power detection can be implemented at a location coupled to, but spaced from, such as coupled near, an input to the radio system, such as at a DFE's inverse fast Fourier transform (iFFT) block, or coupled to, such as coupled near, an output of the radio system at a DFE's FFT block. Time alignment of this data can enable input to output data comparison.

At the native sampling rate, frequency resolution can be equal to the highest system resolution of 1 subcarrier (SC) per frequency bin. However, data can be initially captured and/or subsequently resolved, such as at the FFT/FO component 216, at a granularity below that of 1 sub carrier, thus allowing inspection of energy between frequency bins. In one or more examples, such inspection can be useful for system performance phase noise measurements.

As used herein, a subcarrier is a sideband of a radio frequency carrier wave, which can be modulated. An operating radio system, such as the radio system 100, can have a plurality of subcarriers, such as subcarriers 250 numbered from 0, 1, 2 . . . to j. Subcarrier spacing at the radio system 100 can be based on the numerology configuration of the system. Accordingly, FD power data gathered can be in the format signed 16 bit I+Q for each subcarrier, one, some, or all of the available subcarrier frequencies may be selected for detection and ultimately for storage.

Additionally, generally at a radio system, the more subcarriers that can be packed into a frequency range (i.e., the narrow subcarrier spacing used), the more data that can be transmitted and/or received. In one example, the radio system 100 can have subcarrier spacing of about 30 KHz or numerology 1. Based on physics (e.g., anti-proportional relationship between subcarrier spacing and orthogonal frequency division multiplexing—OFDM—symbol length), narrow subcarrier spacing can correspond to longer OFDM symbol length. Longer OFDM symbol length can correspond to additional spacing for CP (cyclic prefix). With longer CP, the signal can be more tolerable to a fading channel.

Turning now to the identification circuit 212, such circuit can be communicatively coupled to the processor 207 and can be controlled by the processor 207 to identify and/or detect one or more frequencies of the radio 107 of the radio system 100. For example, the identification circuit 212 can be configured to identify power data of one subcarrier separately from power data relative to or from one or more other subcarriers. In one or more embodiments, the identification circuit 212 can be part of and/or comprised by the power detector 210, and thus the aforementioned operations can be performed by the read circuit 211. In one or more embodiments, the identification circuit can be part of the read circuit 211, and thus the aforementioned operations can be performed by the read circuit 211.

Turning next to the power detector 210, which can be a frequency domain (FD) power detector, while the FD PD 210 is shown as part of the radio data analysis system 200 the power detector 210 can be additionally and/or alternatively part of the RU signal capture portion 110.

Power detectors are RF components that can convert an RF input signal into an output DC voltage and/or a digital and/or digitized representation thereof that can be proportional to the incident RF power. Power detectors can be employed for operations relative to automatic gain control circuits, transmit antenna power monitoring, and/or protecting sensitive circuits from pulses and/or power spikes.

The power detector 210 can be any suitable power detector, such as conventionally known by those having skill in the art. In one or more embodiments, the power detector 210 can be capable of reading frequency domain power data. In one or more embodiments, the power detector 210 can be capable of also reading time domain power data. In one or more embodiments, the power detector 210 can be configured to read and/or detect RMS current data and/or peak current data.

Figure 4:
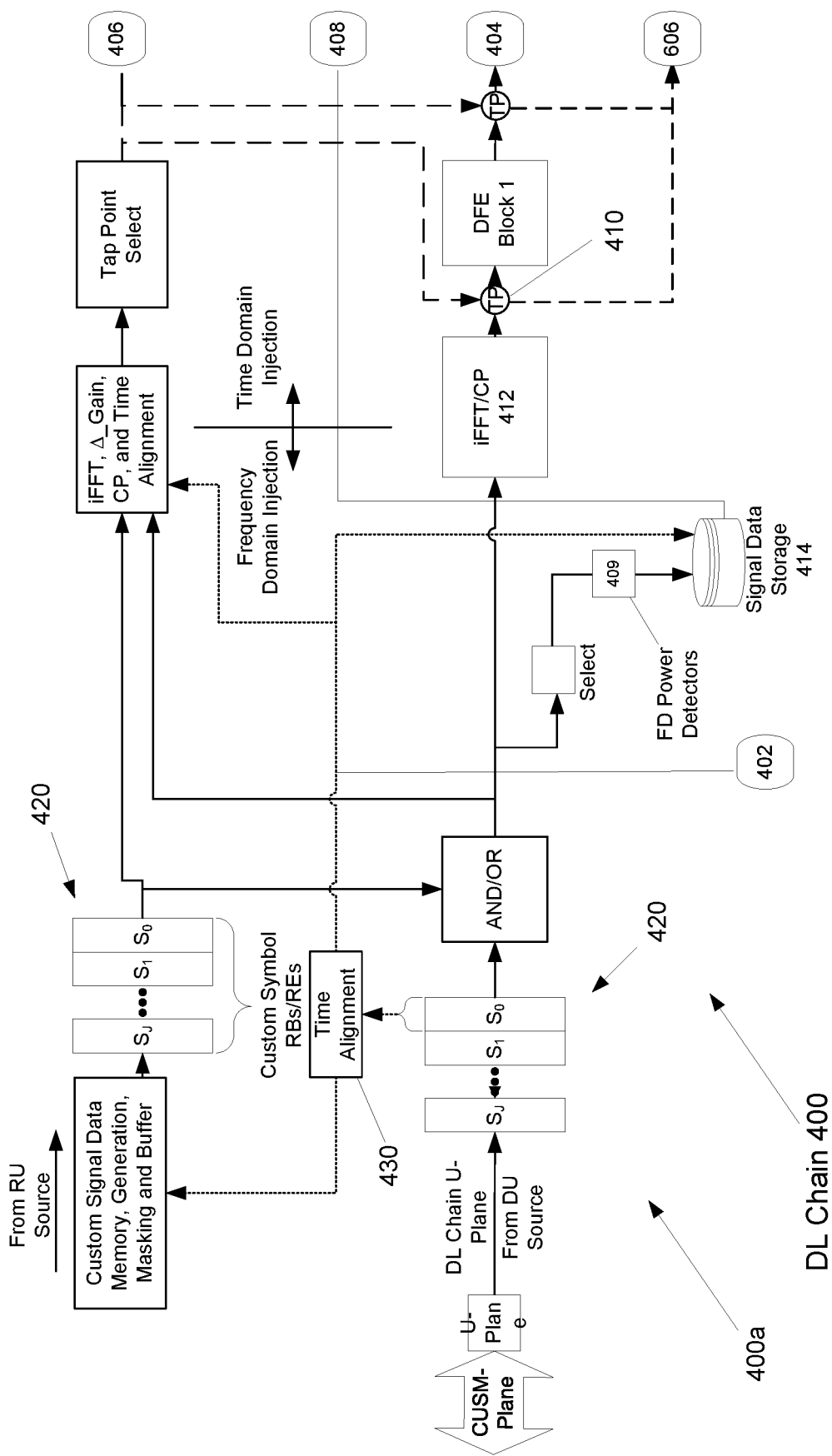
FIG. 4 illustrates a partial schematic diagram of a digital front end downlink chain of the radio of the radio system of FIG. 1, in accordance with one or more embodiments and/or implementations described herein.
Figure 5:
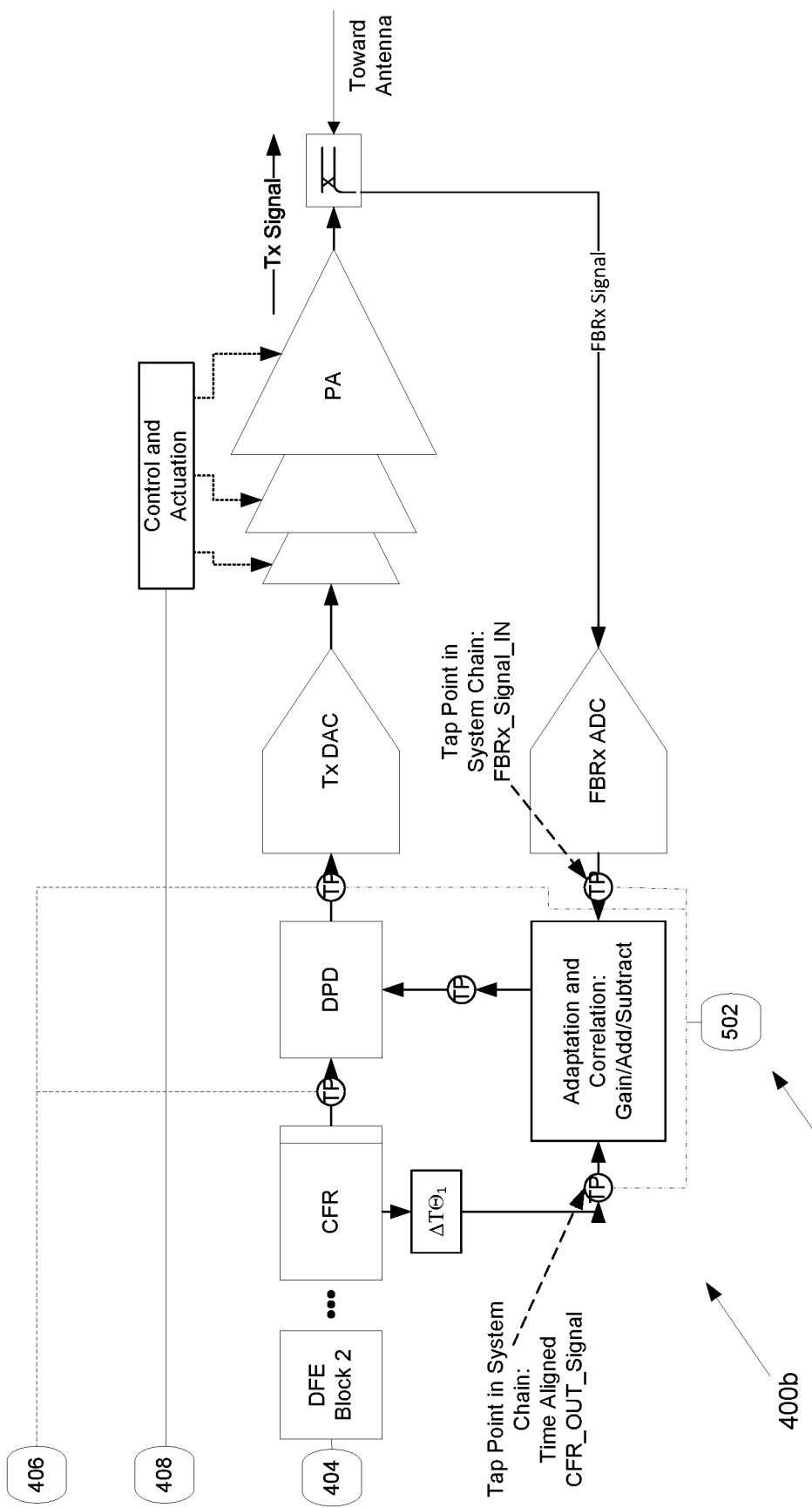
FIG. 5 illustrates another partial schematic diagram of a digital front end downlink chain of the radio of the radio system of FIG. 1, in accordance with one or more embodiments and/or implementations described herein.
Figure 6:
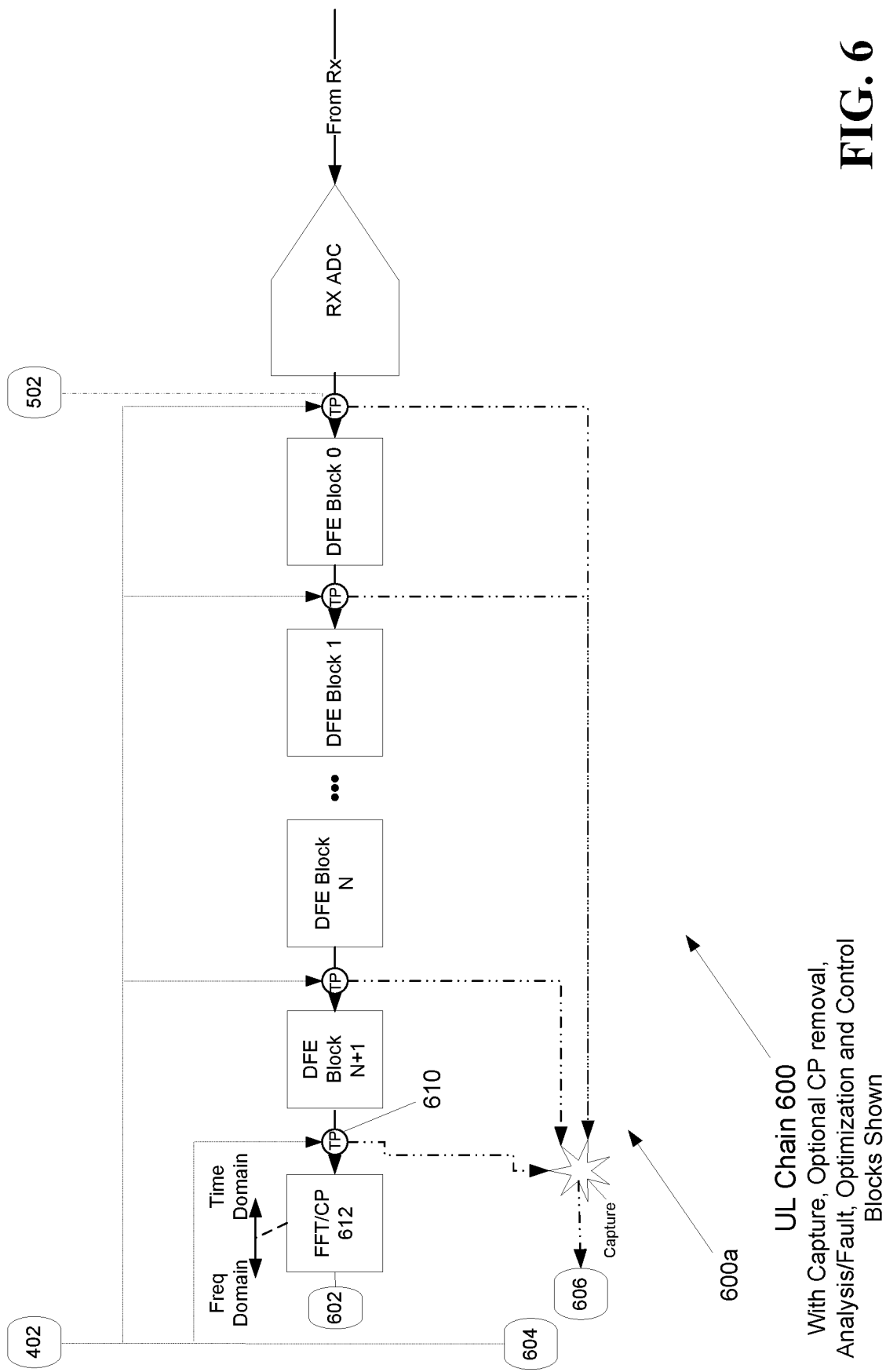
FIG. 6 illustrates a partial schematic diagram of a digital front end uplink chain of the radio of the radio system of FIG. 1, in accordance with one or more embodiments and/or implementations described herein.
Figure 7:
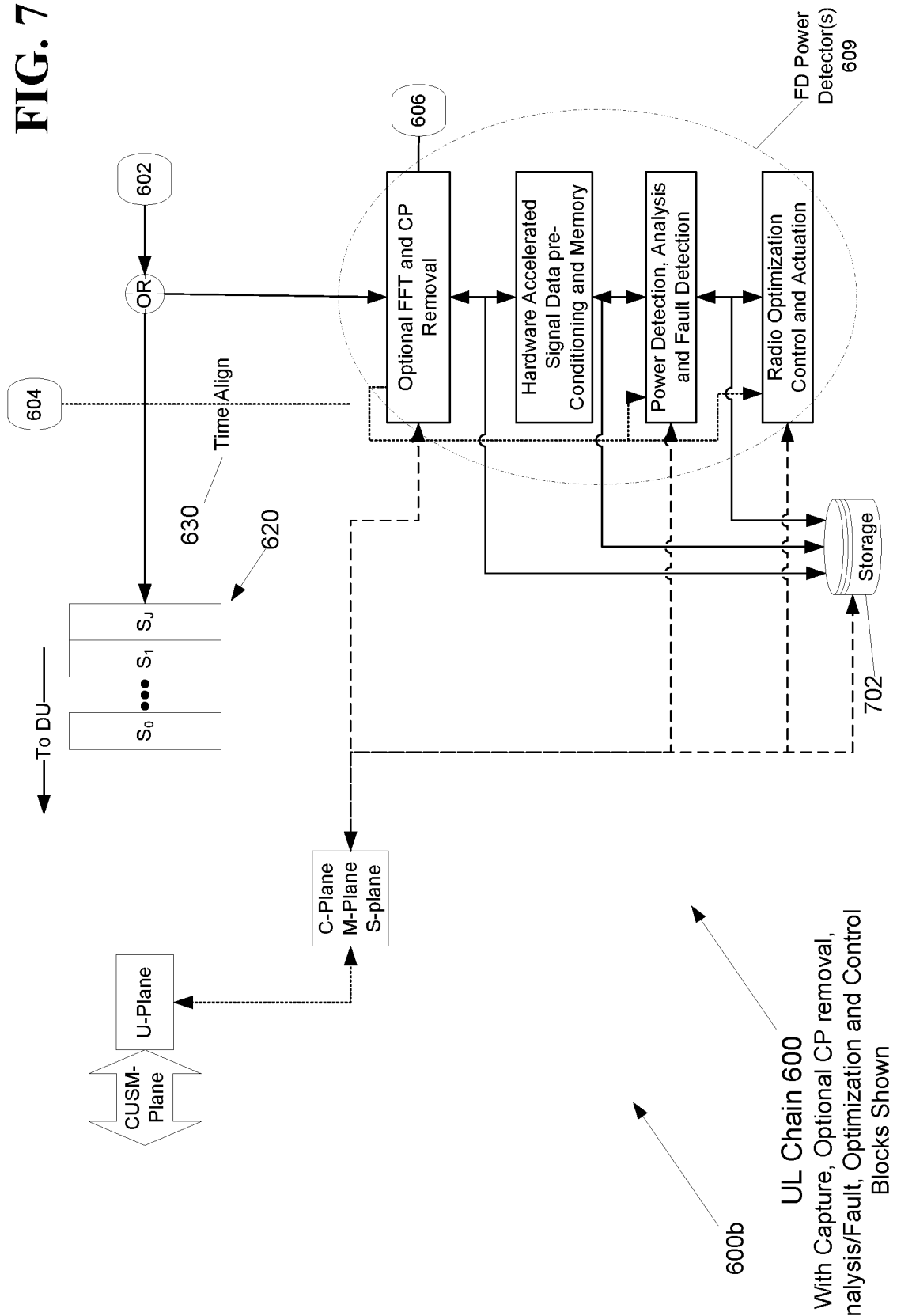
FIG. 7 illustrates another partial schematic diagram of a digital front end uplink chain of the radio of the radio system of FIG. 1, in accordance with one or more embodiments and/or implementations described herein.

The power detector 210 can be coupled to a digital front end (DFB) uplink (UL) or downlink (DL) chain, such as of the radio 107, for accessing the plurality of subcarriers 250 of the radio 107. For example, as illustrated at FIGS. 4 and 6, the power detector 210 can be comprised by and/or separate from the power detectors 409 and 609 to thereby access a subcarrier 250 at the DL chain 400 (FIGS. 4 and 5) and/or UL chain 600 (FIGS. 6 and 7).

Figure 3:
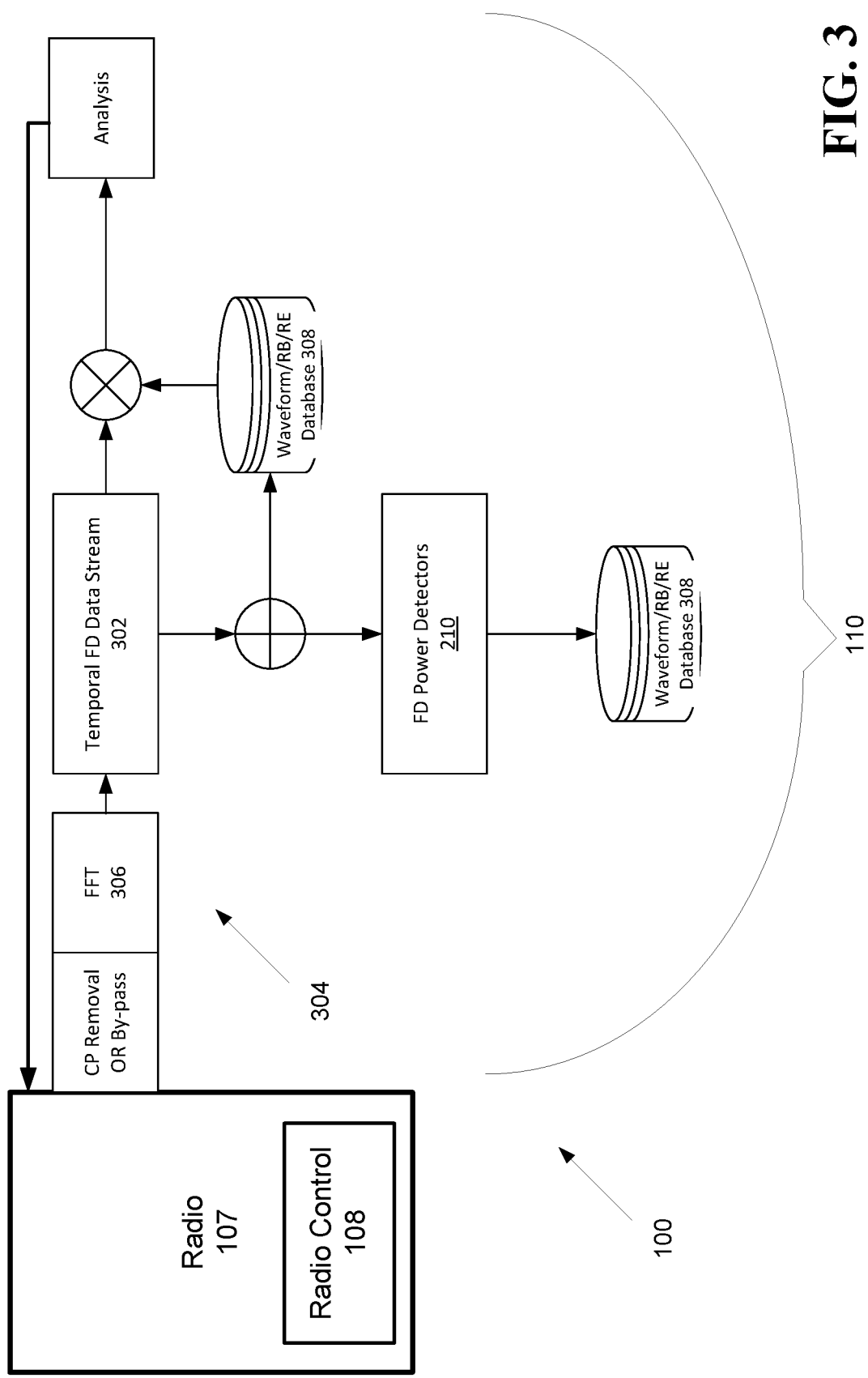
FIG. 3 illustrates a schematic diagram of the radio system of FIG. 1 with the radio hardware unit signal capture portion expanded, in accordance with one or more embodiments and/or implementations described herein.

These schematics of FIGS. 4 to 7 show an additional layer of detail as compared to the schematic illustration of FIG. 3. It is noted that the DL chain 400 and UL chain 600 have are separately shown, and also are split into portions for purposes of detailed illustration. For example, DL chain portions 400a and 400b and UL chain portions 600a and 600b are coupled to one another at connection points 402, 404, 406, 406, 502, 602, 604 and 606.

The power detector 210 can comprise a read circuit 211. The read circuit 211 can be communicatively coupled to the processor 207 and can be at least partially controlled by the processor 207 to read, at the radio system 100, UL chain 600 and/or DL chain 400, power data in a frequency domain. This power data can be native power data at the fronthaul, UL chain 600 and/or DL chain 400. The power data can be read by the read circuit 211 relative to a subcarrier.

As illustrated at FIG. 3, one or more power detectors 210, and thus also respective read circuits 211, can read data from a temporal FD data stream 302. The power detectors 210 can be coupled at a respective DFE chain 304 near an FFT component 306. Briefly, as shown at FIGS. 4 and 6, and also as indicated above, one or more power detectors 210 for detecting power data in the frequency domain can be coupled following the FFT component 612 (FIG. 6) and/or preceding the iFFT component 412 (FIG. 4). The power detectors 210 can be configured to employ one or more databases, such as a waveform/resource block (RB)/resource element (RE) database 308 to therefore detect, recognize and/or convert data from the temporal FD data stream 302 to power data in the frequency domain.

As used herein, a resource block can comprise a collection of sequential subcarriers in frequency domain, such as 12 sequential subcarriers in frequency domain, and thus an RB can be a dimension of a chunk(s) of subcarriers. Additionally, a resource element (RE) can be equal to a single subcarrier. Resource blocks can thus be comprised of resource elements.

The power data can be read by the read circuit 211/power detector 210 at a frequency of a subcarrier 250 and/or at a frequency, sub-frequency or frequency range between subcarriers. As used herein, "between subcarriers" can refer to being between a subcarrier and another subcarrier other than the subcarrier, where the another subcarrier is a next higher or next lower subcarrier of the radio system (e.g., according to the subcarrier spacing of the radio system 100, such as 30 KHz spacing or numerology 1 spacing). That is, the read circuit can be configured to read the power data at a sub-subcarrier granularity of the radio system 100.

Figure 8:
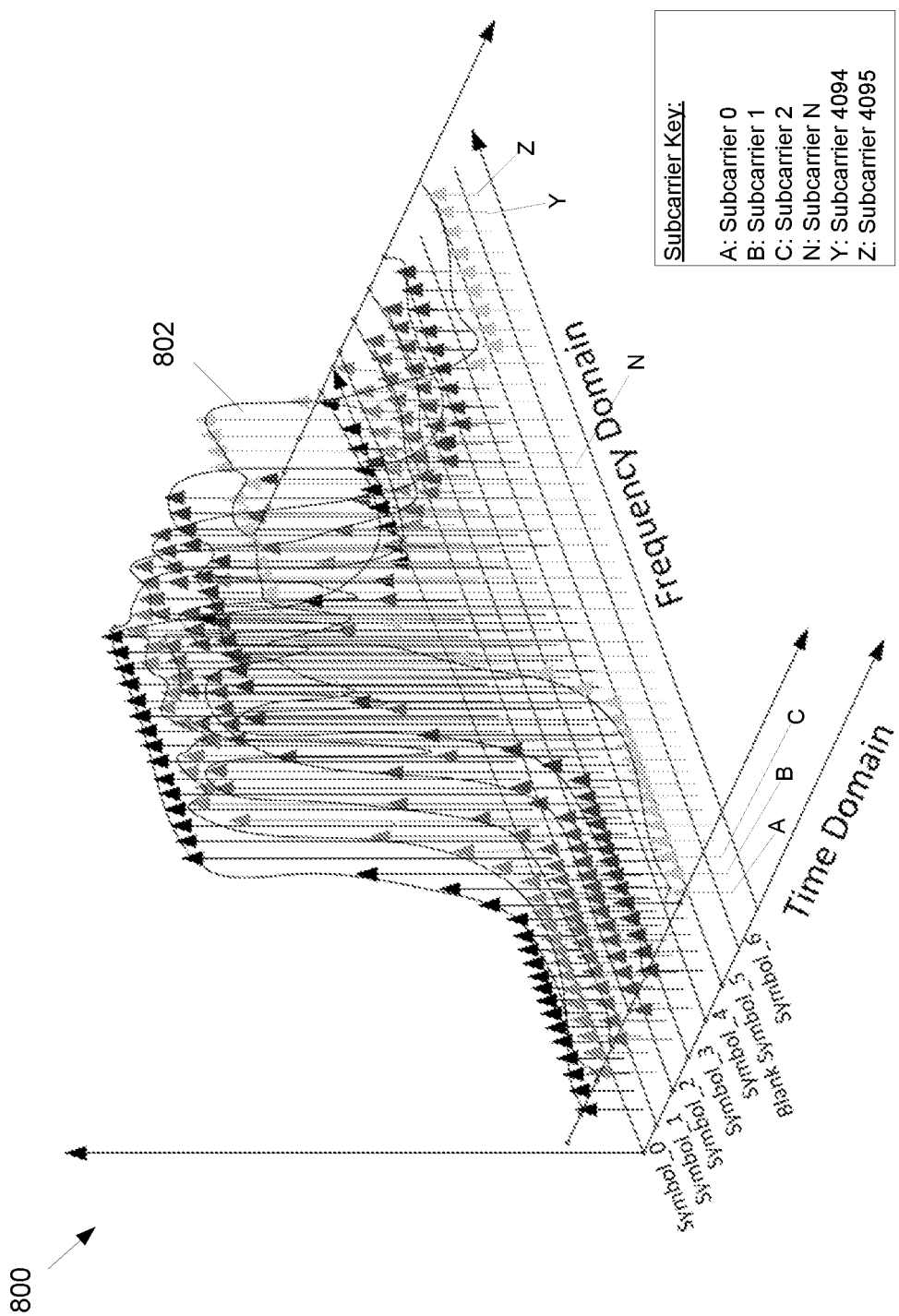
FIG. 8 illustrates a graph illustrating radio frequency information at various subcarriers in a respective frequency domain, and time-aligned at various periods of one symbol of time of a respective time domain, in accordance with one or more embodiments and/or implementations described herein.

As illustrated at FIGS. 4 and 7, frequencies of and/or between subcarriers of the respective DL chain 400 and UL chain 600, e.g., over a known time range relative to symbols in the frequency domain 420 and 620, can be read/detected by the read circuits 211/power detectors 210 of the radio data analysis system 250. That is, each symbol can represent and/or comprise an entire array of unique subcarriers, such as 0 to N or 0 to 4095 as depicted in FIG. 8.

In one or more embodiments, a fast Fourier transform component or a frequency offset (FFT/FO) component 216 can be communicatively coupled to the processor 207 and configured to resolve power data collected between one subcarrier and another subcarrier into a bin defined at least partially by the frequency range. In this way, sub-subcarrier granularity frequencies can be analyzed. Indeed, periodic temporal data may not be enough resolution and higher resolution may be desired and, in such case, a higher sampling rate can be employed to resolve power data in the desired sampling bins. It is noted that the FFT/FO component 216 at FIG. 2 can be the same as the FFT component 612 at FIG. 6, and/or the FFT component at FIG. 6 likewise can be communicatively coupled to the processor 207 and configured to resolve power data collected between one subcarrier and another subcarrier into a bin defined at least partially by the frequency range. In this way, sub-subcarrier granularity frequencies can be analyzed. When referring to bins, such bins can be storage, portions of storage, memory, portions of memory and/or the like, such as memory 209, storage 702, and/or signal data storage 414.

In one or more embodiments, the read circuit 211 can perform one or more calculations directed to determining the power data in the frequency domain from information, signals and/or the like detected by the power detector 210.

For example one or more of the below Equations 1 to 3 can be employed.

$$\text{Power\_}n \text{ (dB)} = 10 \text{ Log } 10(I_{n/32768}^2 + Q_{n/32768}^2); \quad \text{Equation 1:}$$

$$\text{Symbol}_j\text{\_Power\_Subcarrier\_}n \text{ RMS (dB)} = 10 \text{ Log } 10(\Sigma_0^j 10^{((\text{Symbol}_j\text{\_Power\_}n)/10)}/j); \quad \text{Equation 2:}$$

Symbol$_j$_Power_Subcarrier_$n$ peak (dB)=|$_j$ Max(10 Log 10($I_{n/32768}^2+Q_{n/32768}^2$)). As noted above, FD power data can be gathered based on RMS current or peak current specifications. As such, the power detectors 210 can be configured for RMS power and/or peak power applications.    Equation 3:

In one or more embodiments, TD data can be frequency shifted (DDC or DUC), filtered (FIR, HB), and/or decimated (/x) to select a sub-band, or lessen the amount of data collected as a requirement. An alternative desirable data processing option can be to sub-band (filter) the TD data and over sample before transformation to FD thus increasing the frequency bin resolution to that less than 1 SC.

In one or more embodiments, a read circuit 211 of the respective read circuits 211, can be configured to identify and/or to separately record peaks of power data that exceed one or more selected power data unit thresholds in the frequency domain. For example, this identification can be performed prior to initial storage and/or after initial storage. This "pre-conditioning" of data can allow for rapid analysis of bulk data, such as in a relatively real time fashion and/or at any other subsequent point in time, to thereby determine one or more current and/or historical characteristics of the radio system 100, such as radio system 100 operation, relative to the FD power data.

Furthermore, the power detector 210 and read circuit 211 can be configured to read the power data in the frequency domain relative to a selected and/or known time range of the radio system 100 and or gateable event (e.g., defined by a selected and/or known time range of the radio system 100) of the radio system 100.

That is, the FD power data can be detected within a known time boundary over which respective measurement conditions are known and understood. In this way, capturing data across these time boundaries, and thus provision of an undetermined set of information, from one or more different symbols, can be avoided. Instead, synchronization of FD power data, such as between UL and DL chains can be performed and/or otherwise provided.

For example, referring briefly to FIG. 8 and the graph 800, in one or more embodiments of the radio system 100, FD power data can be read/gathered/collected at defined time ranges along the time domain. This can thus allow for defined collection of the various frequency domain data sets 802, based on known increments or symbols in the time domain. For example, the time range can be defined by an upper limit of time and a lower limit of time of the radio system 100. The upper limit of time and the lower limit of time of the time range can be aligned at inherent and/or generated time boundaries of the radio system. An increment of the selected time range can a period of one symbol of time, such as is illustrated at FIG. 8. In one or more embodiments, power data can be detected along time boundaries as narrow as, but not limited to a signal symbol-time in the context of 5G cellular.

Figure 9:
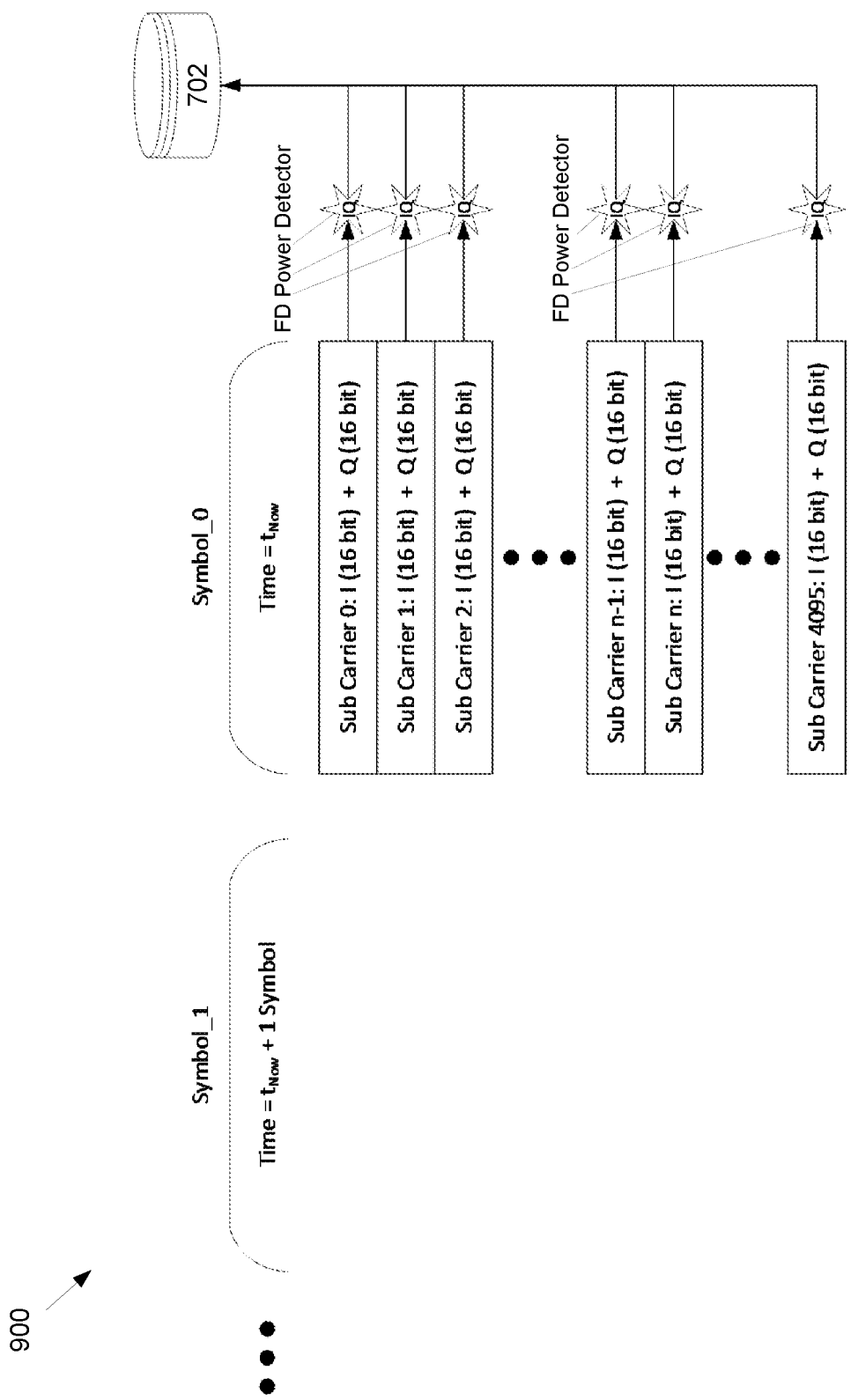
FIG. 9 illustrates a schematic representation of data being read and collected at various subcarriers relative to time-aligned ranges of periods of one symbol of time, in accordance with one or more embodiments and/or implementations described herein.

For example, as illustrated briefly at FIG. 9, various PD data, e.g., from the labeled power detectors 409, 609, can be gathered relative to various subcarriers (and/or relative to sub-subcarrier granularity) at defined time ranges, such as the symbol periods of time illustrated at FIG. 9.

In one or more embodiments, one or more gathered/read sets of power data can be time aligned relative to one or more other gathered/read sets of power data (e.g., data from UL chain 600 vs data from DL chain 400). For example, as shown at FIGS. 4 to 7, time alignment can be performed on the collected data, such as relative to 430 and/or 630. For example, blocks 430 and 630 can be blocks that collect information for time alignment (e.g., gating and/or markers) that can subsequently be used to accelerate processing of the data. It will be appreciated that such time alignment can be performed during power data collection, before initial power data storage and/or after power data is initially stored.

Indeed, FD power detection can be desirable over TD power detection as the FFT portion of the analysis heavy lifting can performed in the DFE using DFE blocks, and therefore would not need to be performed in SW or be further post-processed.

Also, indeed, such symbol/symbol alignment can ensure that the power data being compared/contrasted captured from different tap points can produce relevant and comparable results. Such comparison can be between UL and DL data and/or between data at different historical points in time. For example, DFE data in the FD prior to iFFT on the DL and following the FFT block on the UL can be only valid within the radio system's time boundary of a symbol.

Via collecting valid FD power data over time, some or all of the subcarriers (SCs) can be collected along a symbol period in a single instant in time. It is briefly noted that further data manipulation can be performed such as, but not limited to, averaging, and statistical counting and/or accumulation and/or analysis of in-band and/or out of band performance directly from the data and/or as selectively as down to a single SC.

Again referring FIGS. 4 to 7, and also FIG. 2, collected/read/gathered data can be stored. As indicated above, one or more calculations and/or analysis can be performed during collection, prior to initial storage and/or after initial storage. Storage employed can be configured for recall of data for subsequent use and/or analysis. For example, the power data can be stored at a memory (e.g., memory 209) communicatively coupled to the processor 207 and configured to receive and store the power data in the frequency domain from the read circuit 211. The memory and/or other storage can initially be short-term memory, and thus a long-term memory 230 can be employed to which power data can be moved from the temporary or short-term memory. The long-term memory can be configured to store data longer than the temporary or short-term memory.

Figure 10:
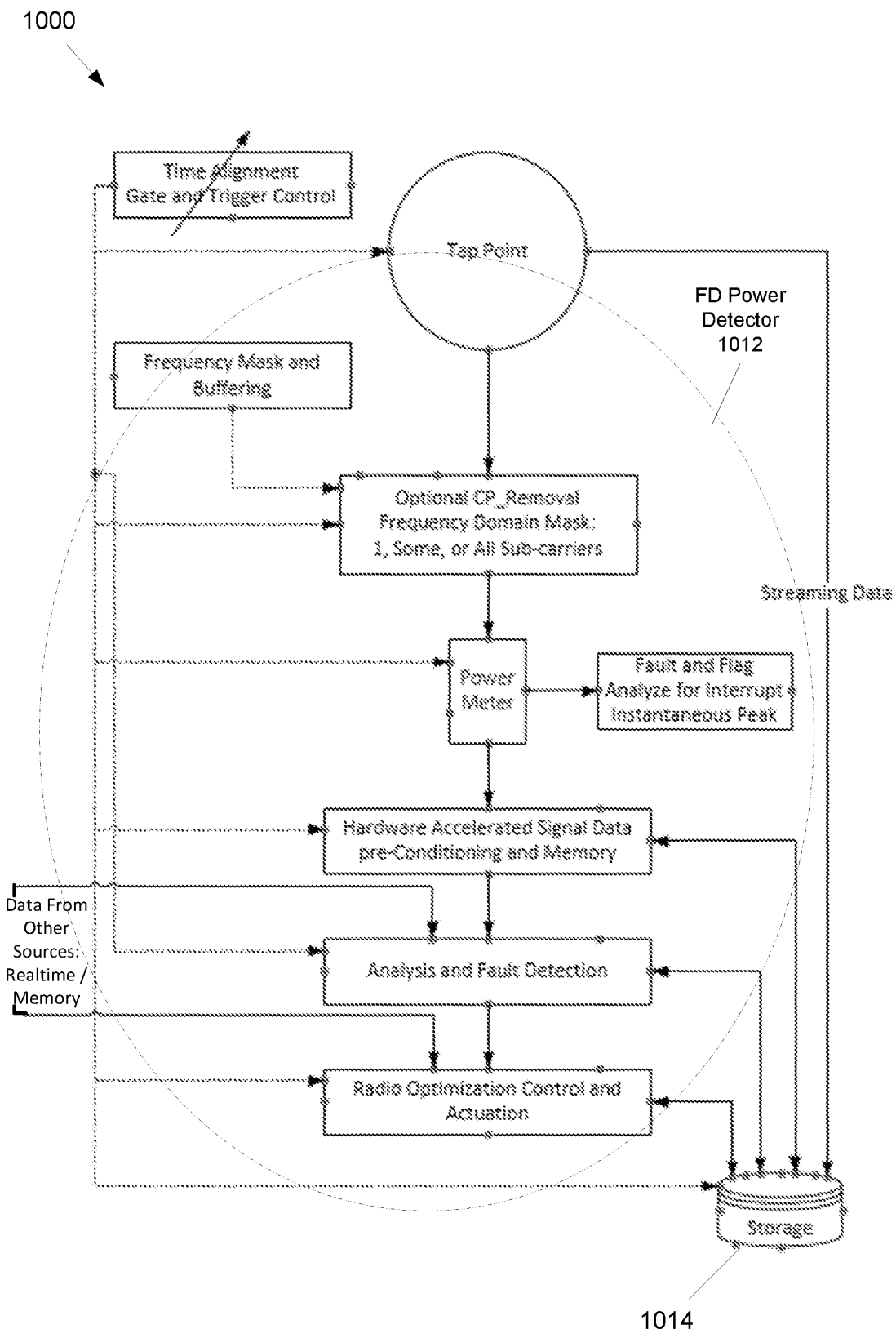
FIG. 10 illustrates a schematic diagram of a portion of the radio hardware unit of the radio system of FIG. 1, in accordance with one or more embodiments and/or implementations described herein.

Referring next to FIG. 10, detail is provided relative to a FD power detector 1012 at a respective tap point, such as following an FFT component of a UL chain and/or preceding an iFFT component of a DL chain. The FD power detector 1012 can be similar to the FD power detectors 210, 409, 609 discussed above, and thus discussion related to the FD power detectors 210, 409, 609 can equally apply to the FD power detector 1012 and/or vice versa.

As illustrated, one or more operations can be performed, such as by the power detector 1012 and/or a by a respective processor. The one or more operations can comprise (and/or be employed for) a frequency mask, buffering, CP removal, applying a frequency domain mask, fault and flag analysis for interrupt instantaneous peak, power monitoring, analysis and fault detection, radio optimization control and actuation, and/or the like. One or more of the operations can be performed prior to or via recall from storage 1014. It is noted that storage 1014 can be replaced by and/or supplemented by any of memory 209, storage 414, storage 702 and/or other storage of the radio system 100 and/or external thereto.

Referring now again to FIG. 2, in one or more embodiments, a group of power detectors 210, as illustrated at FIG. 2, can be collectively configured to control collection of power data from a group of subcarriers 250 of the radio system 100. The power detectors 210 of the group of power detectors can comprise respective read circuits 211 that can be configured to read the power data in a frequency domain, of a single subcarrier 250 of the group of subcarriers, or of a single frequency range between a successive pair of subcarriers 250 of the group of subcarriers, along a common selected time range having boundaries that are aligned at time boundaries of the radio system 100. The respective read circuits 211 can be further configured to read the power data in the frequency domain to a memory (e.g., memory 209 or other storage) communicatively coupled to and configured to receive and store power data from at least one subcarrier 250 of the group of subcarriers. In such case, one or more identification circuits 212 can be communicatively coupled to power detectors 210 of the group of power detectors and configured to identify power data in the frequency domain for respective subcarriers 250 or a frequency range separately from power data in the frequency domain for one or more other subcarriers or frequency ranges of the radio system. In an exemplary case a radio data analysis system 200 can record power for one, some, or all subcarriers 250, such as simultaneously.

In one or more embodiments, a group of radio data analysis systems 200 can be provided at a radio system (e.g., radio system 100). Each radio data analysis system 200 of the group of systems can be configured to read and record power data in the frequency domain along respective different selected time ranges that are each aligned at the radio system's (e.g., radio system 100) time boundaries.

In one or more embodiments, any of the aforementioned detecting and reading can be implemented at plural radio antenna branches of a same radio system, a different radio system, or relative to two or more carriers employing at least the radio system. In an exemplary case a radio data analysis system 200 can record power for one, some, or all antenna branches, such as simultaneously.

In one or more embodiments, the radio data analysis system 200, such as the processor 207, can combine, such as at the memory 209 and/or other storage first power data in the frequency domain with second power data in a time domain of the same radio system 100, wherein the time domain can comprise the defined time ranges of the radio system 100. In an exemplary case, signals when combined with TD (time domain) power detect and/or combined with open radio access network (ORAN) blocks and/or transmit (Tx) blanking information can enable aspects of determination of performance aspects of the radio system 100 not limited to system operations and/or maintenance.

Figure 11:
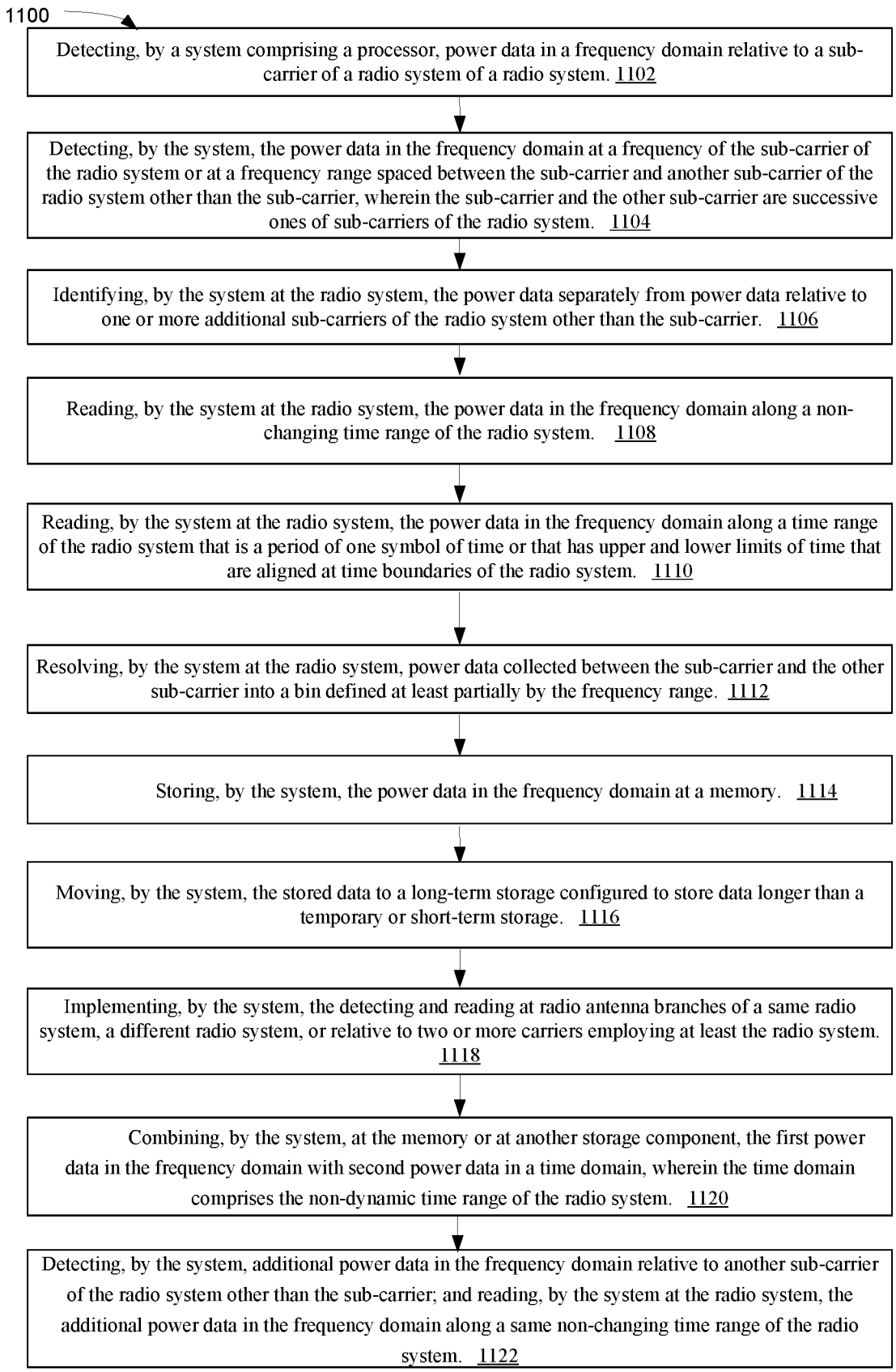
FIG. 11 illustrates a process flow diagram of a method of reading, collecting and storing frequency domain power data of a radio system, in accordance with one or more embodiments and/or implementations described herein.

Turning now to FIG. 11, a process flow comprising a set of operations is illustrated relative to FIG. 2 for detecting and storing time-aligned frequency domain power data, such as where the power data is natively in the frequency domain. One or more elements, objects and/or components referenced in the process flow 1100 can be those of system 100 and/or system 200. Repetitive description of like elements and/or processes employed in respective embodiments is omitted for sake of brevity.

At operation 1102, the process flow 1100 can comprise detecting, by a system comprising a processor (e.g., identification circuit 212), power data in a frequency domain relative to a subcarrier of a radio system of a radio system.

At operation 1104, the process flow 1100 can comprise detecting, by the system (e.g., identification circuit 212), the power data in the frequency domain at a frequency of the subcarrier of the radio system or at a frequency range spaced between the subcarrier and another subcarrier of the radio system other than the subcarrier, wherein the subcarrier and the other subcarrier are successive ones of subcarriers of the radio system.

At operation 1106, the process flow 1100 can comprise identifying, by the system at the radio system (e.g., identification circuit 212), the power data separately from power data relative to one or more additional subcarriers of the radio system other than the subcarrier.

At operation 1108, the process flow 1100 can comprise reading, by the system at the radio system (e.g., read circuit 211), the power data in the frequency domain along a non-changing time range of the radio system.

At operation 1110, the process flow 1100 can comprise reading, by the system at the radio system (e.g., read circuit 211), the power data in the frequency domain along a time range of the radio system that is a period of one symbol of time or that has upper and lower limits of time that are aligned at time boundaries of the radio system.

At operation 1112, the process flow 1100 can comprise resolving, by the system at the radio system (e.g., FFT/frequency offset component 216), power data collected between the subcarrier and the other subcarrier into a bin defined at least partially by the frequency range.

At operation 1114, the process flow 1100 can comprise storing, by the system (e.g., memory 209), the power data in the frequency domain at a memory.

At operation 1116, the process flow 1100 can comprise moving, by the system (e.g., processor 207), the stored data to a long-term storage configured to store data longer than a temporary or short-term storage.

At operation 1118, the process flow 1100 can comprise implementing, by the system (e.g., processor 207), the detecting and reading at radio antenna branches of a same radio system, a different radio system, or relative to two or more carriers employing at least the radio system.

At operation 1120, the process flow 1100 can comprise combining, by the system (e.g., processor 207), at the memory or at another storage component, the first power data in the frequency domain with second power data in a time domain, wherein the time domain comprises the non-dynamic time range of the radio system.

At operation 1122, the process flow 1100 can comprise detecting, by the system (e.g., identification circuit 212), additional power data in the frequency domain relative to another subcarrier of the radio system other than the subcarrier; and reading, by the system (e.g., read circuit 211) at the radio system, the additional power data in the frequency domain along a same non-changing time range of the radio system.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of diagrams 1100 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can gather frequency domain power data for enabling real-time adjustment of one or more parameters of a radio system. In an embodiment, a system can comprise a processor that is configured to control collection of power data relative to a subcarrier of a radio system, a read circuit communicatively coupled to the processor and controlled by the processor to read, at the radio system, the power data in a frequency domain, relative to the subcarrier, along a selected time range that is defined by an upper limit of time and a lower limit of time, and a memory communicatively coupled to the processor and that receives and stores the power data in the frequency domain from the read circuit. In one or more embodiments, power data in the frequency domain is collected at a frequency of a subcarrier and/or at a frequency between subcarriers.

As a result, a method can be provided to read, collect and store power data information for immediate and/or later analysis. One or more actions can be taken relative to the data, to assist with radio system frequency, maintenance, customer experience and/or the like. In one or more embodiments, one or more actions can be triggered, such as relative to a quantity, quality and/or other aspect of the data read, collected and/or stored. A practical application of one or more techniques performed by one or more embodiments described herein can be collection of datas being time-aligned to one another relative to a plurality of subcarriers of a radio system.

Another practical application can be collecting statistics of current traffic of DL and UL on the RU side instead of the DU side of a respective radio system, such as where frequency domain data is native (e.g., on the DL/UL side). In this way, information can be gathered "upfront" to allow for any parameter adjustment. Such practical application can comprise the gather and collecting of FD power data, and thus the building of FD power data statistics over time.

Such comparable data can be beneficial for a variety of applications, as described herein. For example, radio systems typically employ large quantities of power, and the one or more embodiments described herein can, through data collection and storage, facilitate reducing power consumption of a respective radio system. This can be facilitated through performance enhancements, firmware changes and/or upgrades, and/or over the air updates to customer equipment in the field (e.g., which are employing and/or can employ the respective radio system). Particular advantages can comprise, but are not limited to, reduction of occurrence/rate of no fault found (NFF) returns, cost of field returns, and/or customer outage occurrences/times.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide data collection, such as time-aligned data collection in the frequency domain, as compared to existing systems and/or techniques. Systems, computer-implemented methods and/or computer program products facilitating performance of these processes are of great utility in the field of data storage and/or radio system management and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively collect frequency domain data in the time that one or more embodiments described herein can facilitate this process. And, neither can the human mind nor a human with pen and paper electronically collect frequency domain data as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 12:
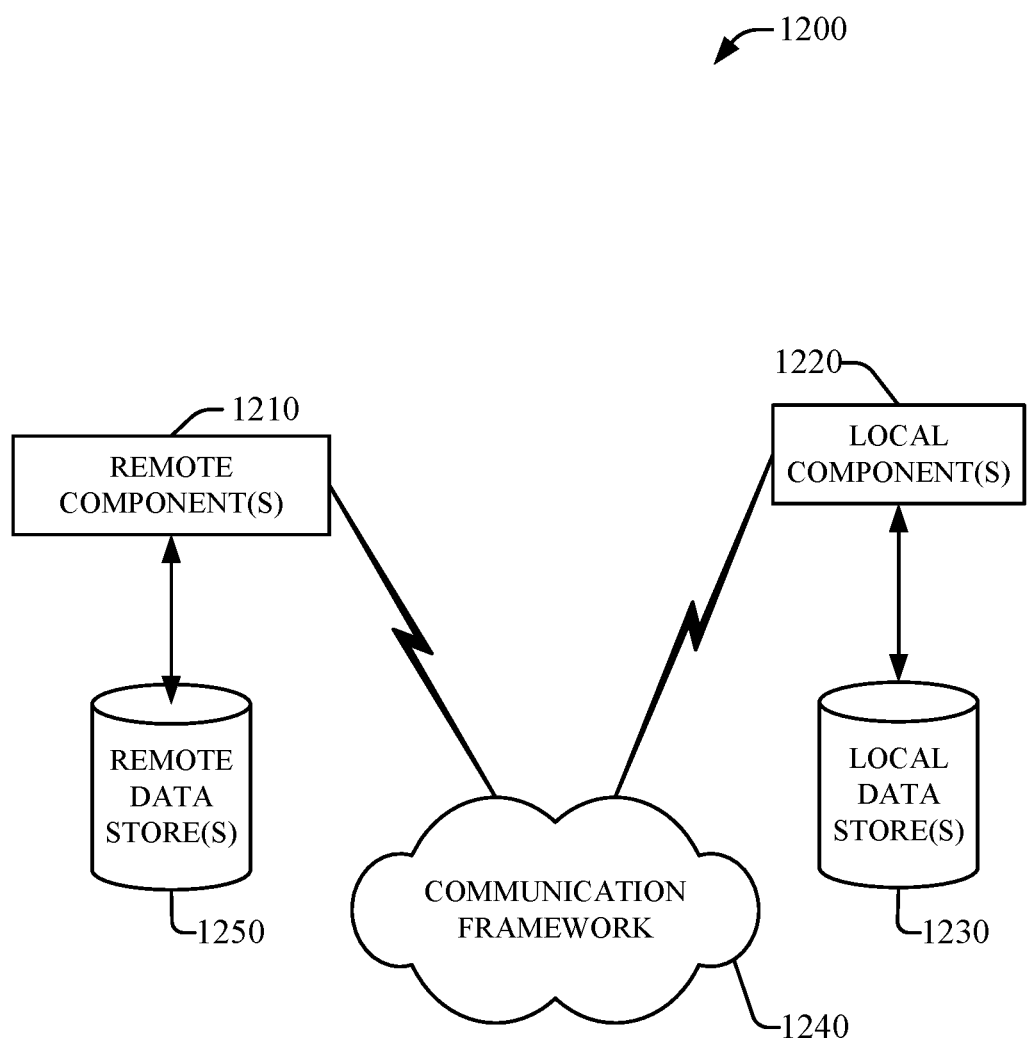
FIG. 12 illustrates a block diagram of an example operating environment into which embodiments of the subject matter described herein can be incorporated.

FIG. 12 is a schematic block diagram of an operating environment 1200 with which the described subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Example Computing Environment

Figure 13:
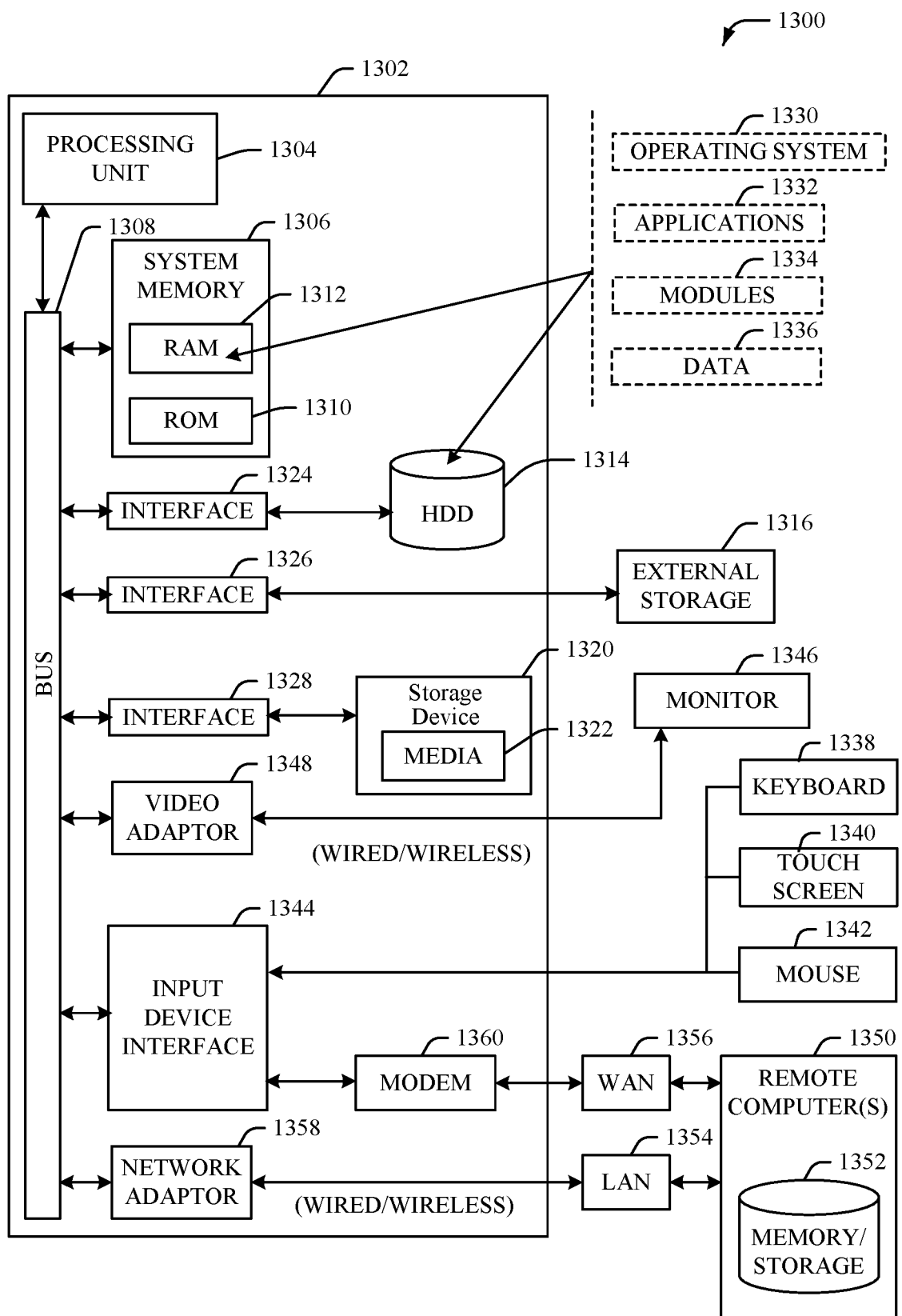
FIG. 13 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 13, the example computing environment 1300 which can implement one or more embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. The network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor that is configured to control collection of power data relative to a subcarrier of a radio system;
a read circuit communicatively coupled to the processor and controlled by the processor to read, at the radio system, the power data in a frequency domain, relative to the subcarrier, along a selected time range that is defined by an upper limit of time and a lower limit of time;
a memory communicatively coupled to the processor and that receives and stores the power data in the frequency domain from the read circuit; and
a fast Fourier transform component or a frequency offset component, communicatively coupled to the processor, that resolves power data collected between the subcarrier and another subcarrier into a bin defined at least partially by a frequency range between the subcarrier and the other subcarrier, wherein the other subcarrier is directly adjacent the subcarrier within the frequency domain.

2. The system of claim 1, further comprising:
an identification circuit communicatively coupled to the processor and that identifies the power data separately from power data relative to one or more additional subcarriers of the radio system other than the subcarrier.

3. The system of claim 1, wherein an increment of the selected time range is a period of one symbol of time.

4. The system of claim 1, wherein the upper limit of time and the lower limit of time of the time range are aligned at time boundaries of the radio system.

5. The system of claim 1, wherein the other subcarrier is a directly next higher or directly next lower subcarrier of the radio system relative to the subcarrier.

6. The system of claim 1,
wherein the memory is a temporary or short-term memory, and
further comprising a long-term memory to which power data is moved from the temporary or short-term memory, wherein the long-term memory stores data longer than the temporary or short-term memory.

7. The system of claim 1, further comprising:
at least one additional read circuit that also is communicatively coupled to the processor and controlled by the processor to read, at the radio system, the power data in a frequency domain, relative to the subcarrier, along a selected time range that is defined by an upper limit of time and a lower limit of time.

8. The system of claim 1, wherein the read circuit is configured to identify and to separately record a peak of power data, between the subcarrier and the other subcarrier, that exceeds one or more selected power data unit thresholds.

9. A master system, comprising:
a group of systems as defined in claim 1, wherein each system of the group of systems is configured to read and record power data in the frequency domain along respective different selected time ranges that are each aligned at the radio system's time boundaries.

10. A system, comprising:
a group of power detectors that are configured to control collection of power data from a group of subcarriers of a radio system,
wherein the power detectors of the group of power detectors comprise respective read circuits that are configured to read the power data in a frequency domain, of a same single subcarrier of the group of subcarriers, or of a same single frequency range between a successive pair of subcarriers of the group of subcarriers, along a common selected time range having boundaries that are aligned at time boundaries of the radio system, and
wherein the respective read circuits are further configured to read the power data in the frequency domain to a memory communicatively coupled to and configured to receive and store power data from at least one subcarrier of the group of subcarriers.

11. The system of claim 10, wherein an increment of the selected time range is a period of one symbol of time.

12. The system of claim 10, wherein a read circuit of the respective read circuits, is configured to identify and to separately record peaks of power data that exceed one or more selected power data unit thresholds.

13. The system of claim 10, further comprising:
an identification circuit communicatively coupled to a power detector of the group of power detectors and configured to identify power data in the frequency domain for a respective subcarrier or a frequency range separately from power data in the frequency domain for one or more other subcarriers or frequency ranges of the radio system.

14. The system of claim 10, wherein the power detectors of the group of power detectors have associated therewith respective fast Fourier transform components or a respective frequency offset components that respectively resolve the power data, collected between the subcarrier and another subcarrier, into a same bin defined at least partially by a frequency range between the subcarrier and the other subcarrier, and wherein the other subcarrier is directly adjacent the subcarrier within the frequency domain.

15. A method, comprising:
controlling, by a processor of a system comprising the processor, collection of power data relative to a subcarrier of a radio system;
reading, by a read circuit of the system communicatively coupled to the processor, the power data in a frequency domain, relative to the subcarrier, along a selected time range that is defined by an upper limit of time and a lower limit of time;
receiving and storing, by a memory of the system communicatively coupled to the processor, the power data in the frequency domain from the read circuit; and
resolving, by the processor, the power data, collected at a sub-subcarrier granularity, associated with the subcarrier, of the radio system, into a bin defined at least partially by a frequency range at the sub-subcarrier granularity.

16. The method of claim 15, wherein the sub-subcarrier granularity is defined by a frequency range between the subcarrier and another subcarrier, and wherein the other subcarrier is a directly next higher or directly next lower subcarrier of the radio system relative to the subcarrier.

17. The method of claim 15, wherein a memory is communicatively coupled to the processor, wherein the memory is a temporary or short-term memory, wherein a long-term memory also is communicatively coupled to the processor, wherein power data is moved from the temporary or short-term memory to the long-term memory, and wherein the long-term memory stores data longer than the temporary or short-term memory.

18. The method of claim 15, further comprising:
identifying and separately recording, by the processor, a peak of power data, at the sub-subcarrier granularity, wherein the peak exceeds one or more selected power data unit thresholds.

19. The method of claim 15, wherein an increment of the selected time range is a period of one symbol of time.

20. The method of claim 15, further comprising:
identifying, by the processor, power data in the frequency domain for the subcarrier or the frequency range separately from power data in the frequency domain for one or more other subcarriers or frequency ranges of the radio system.

\* \* \* \* \*